United States Patent [19]

Matthews et al.

[11] Patent Number: 4,856,593
[45] Date of Patent: Aug. 15, 1989

[54] INHIBITION OF HYDRATE FORMATION

[75] Inventors: Robert R. Matthews; Charles R. Clark, both of Ponca City, Okla.

[73] Assignee: Conoco Inc., Ponca City, Okla.

[21] Appl. No.: 99,358

[22] Filed: Sep. 21, 1987

[51] Int. Cl.⁴ .................. E21B 43/00; E21B 43/28
[52] U.S. Cl. .................. 106/310; 166/371; 252/8.3; 137/13
[58] Field of Search ............. 166/310, 304, 311, 312, 166/371, 902; 252/8.3, 8.51, 8.552, 8.514; 137/13; 210/699; 585/15, 950; 175/65

[56] References Cited

U.S. PATENT DOCUMENTS

| 2,142,212 | 1/1939 | Russell | 585/15 X |
|---|---|---|---|
| 2,429,594 | 10/1947 | Case | 166/310 X |
| 2,690,814 | 10/1954 | Reid | 585/950 X |
| 2,777,818 | 1/1957 | Gambil | 166/310 X |
| 3,021,901 | 2/1962 | Earlougher | 252/8.552 X |
| 3,102,548 | 9/1963 | Smith et al. | 137/13 |
| 3,348,614 | 10/1967 | Sinclair et al. | 166/310 |
| 4,284,513 | 8/1981 | Scholl et al. | 210/699 |

OTHER PUBLICATIONS

Uren, Lester "Petroleum Production Engineering-Oil Field Exploitation", 1953, pp. 600–602.

Primary Examiner—Bruce M. Kisliuk

[57] ABSTRACT

Stoppage of gas-water streams due to the formation of gas hydrates is prevented by incorporating in such streams a surface active agent which inhibits the formation of gas hydrates and/or the agglomeration of hydrate crystallites into large crystalline masses.

5 Claims, 1 Drawing Sheet

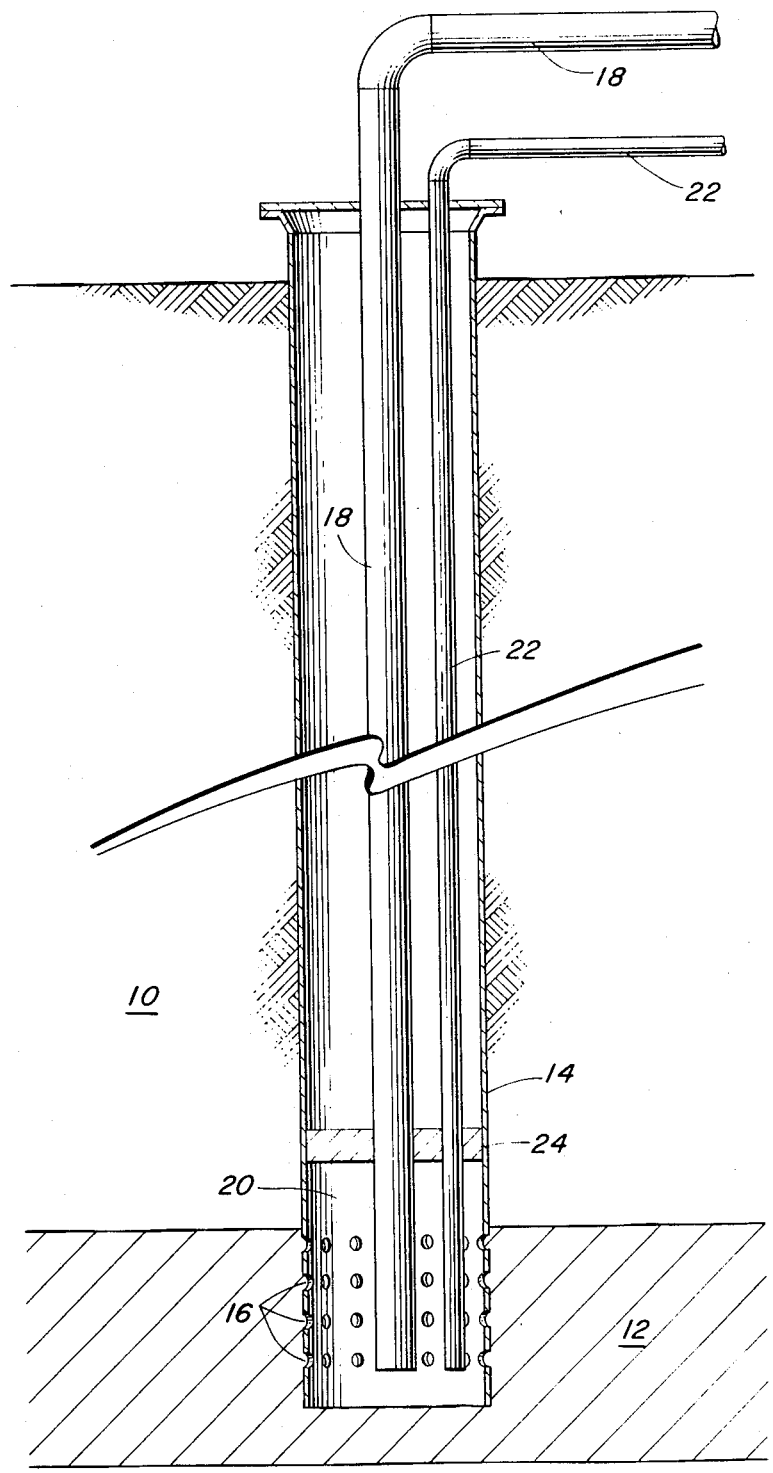

INHIBITION OF HYDRATE FORMATION

BACKGROUND AND SUMMARY OF THE INVENTION

Gas wells are drilled into subterranean formations to produce natural gas trapped in such formations. Gas wells generally are completed with tubing inside of a wellbore or casing. Regardless of whether the well has a casing, an annular space is provided around the tubing. In many wells, this annular space extends from the formation to the top of the well. In the production of gas, the gas passes from the formation across the annular space and into the tubing. The gas then passes upward through the tubing to a surface conduit.

Often gas passing from the formation to the surface conduit undergoes a reduction in temperature. This temperature reduction may be due to the gas passing through a portion of the well which is at a low temperature. This low temperature may occur where there is a very cold surface temperature and thus a steeply dipping thermal gradient in the upper subterranean formations through which the well passes. This low temperature may also occur where the gas well is on the edge of a mountainous area and melting snow pours cold water through a subterranean formation through which the well passes. The low temperature may also occur as a result of a large pressure reduction in the gas as it passes to the surface, for example, where the gas passes through a downhole pressure regulator.

Upon reduction in temperature of natural gas, when water is present in the gas (wet gas), hydrates are capable of forming. As used herein, the term "wet gas" refers to natural gas containing sufficient moisture to make it susceptible to hydrate formation upon reduction of temperature. Depending upon the pressure of the gas, the hydrates may form at temperatures well above the freezing point of water. Thus, at 1000 pounds per square inch, hydrates may form at a temperature of 61° F. with 0.6 specific gravity gas. These hydrates are crystals, analogous to ice crystals, of water in combination with a liquefiable component of the gas stream. The formation of these hydrates presents a problem in that they can effect a solid blockage to flow of the gas at the points where they form and accumulate. Thus, where the natural gas becomes reduced in temperature in its passage from the formation to the surface conduit, hydrates may form with consequent blockage to the flow of the gas.

Normal production of natural gas from a well frequently involves temporary shutting in of the well. For example, the well may be shut in temporarily for the purpose of avoiding production in excess of state allowables. The problem of the formation of hydrates is particularly severe when production of natural gas is started from a well which has been shut in. The pressure within the shut-in gas well will reach equilibrium with the pressure in the subterranean formation, and this pressure will be higher than the flowing pressure of the well. The pressure drop into the surface conduit on start up will, therefore, be greater than in normal production, engendering greater cooling and thus lower temperatures. Further, the gas will be cooler having attained temperature equilibrium with its environment within the well.

According to this invention, stoppage of gas production from gas wells is prevented by incorporating in the gas a surface active agent which inhibits the formation of gas hydrates and/or the agglomeration of hydrate crystallites into large crystalline masses which are capable of blocking gas flow.

The method of this invention is also applicable to other situations where gas hydrates may affect gas flow, eg. during drilling of gas wells or oil wells where gas is present and in pipelining of gas or gas-containing liquids.

PRIOR ART

U.S. Pat. Nos. 3,348,614; 4,256,282 and 4,456,067 disclose the use of alcohols and/or glycols to prevent the formation of gas hydrates.

Soviet Patent Application 976,035 discloses the use of a mixture of urea, glycerin and water to prevent the formation of gas hydrates.

U.S. Pat. Nos. 3,483,925 and 3,703,928 disclose the use of various orgaic phosphates and phosphonates to inhibit scale in squeeze treatments.

BRIEF DESCRIPTION OF THE DRAWINGS

The drawing is a schematic flow diagram (partially in cross-section) of a gas production well.

DETAILED DESCRIPTION OF THE INVENTION

Referring to the drawing, gas well 10 is completed in subterranean formation 12 containing natural gas at an elevated pressure. Well 10 is conventionally cased with casing 14 having perforations 16 leading into subterranean formation 12. Tubing 18 is suspended within casing 14 and provides an annulus 20 communicating with the subterranean formation and tubing. Also provided is a work string or spaghetti string 22 which is disposed in the annulus adjacent tubing 18. Packer 24 isolates the upper portion of the well from formation 12 except as provided by tubing 18 and work string 22.

A suitable surface active agent which inhibits the formation of gas hydrates and/or the agglomeration of hydrate crystallites into large crystalline masses is introduced through work string 22 and co-mingles with natural gas flowing from subterranean formation 12 into tubing 18. Usually the surface active agent is continuously injected into the well as long as natural gas is being produced through tubing 18. If desired, a sufficient amount of surface active agent may be introduced to provide an accumulation of this material at the bottom of annulus 20 in order to further inhibit the formation and/or agglomeration of hydrates which may form after gas production is resumed.

A wide variety of surface active agents may be employed in carrying out the process of the invention. They include such materials as phosphonates, phosphate esters, phosphonic acids, esters of phosphonic acids, inorganic polyphosphates, salts and esters of inorganic polyphosphates, and polymers such as polyacrylamides and polyacrylates.

A number of phosphonates may be used in the process. Suitable materials include nitrogen-containing phosphonate compounds such as the salts of nitrilo (methylene phosphonic acid) or diethylenetriaminepenta (methylene phosphonic acid). The acids are available from Monsanto Chemical Co. under the trade names DEQUEST 2000 and DEQUEST 2060. Other phosphonic acids available from Monsanto include ethylenediaminetetramethylene phosphonic acid (DEQUEST 2041) and sodium aminotrimethylene phosphonic acid (DEQUEST 2006). All of the above phosphonic acids contain nitrogen. However, other DEQUEST materials which do not are also available and are also suitable in carrying out the process of the invention. Salts of these acids may be formed by reaction with a basic solution in a conventional manner.

Other organic phosphonate compounds (disclosed in U.S. Pat. No. 3,483,925) which may be used are salts of either: (a)

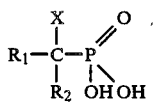

where $R_1$ is selected from the group consisting of H, alkyl groups up to four carbon atoms, phenyl, and phosphonic acid groups. $R_2$ is selected from the group consisting of hydrogen, alkyl groups having up to 4 carbon atoms and

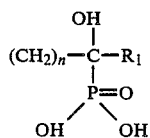

where n is an integer from 0 to 8, and X is H or OH, or (b)

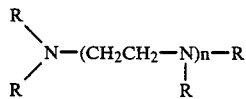

where R is selected from the group consisting of hydrogen and

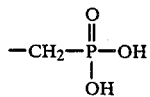

provided, however, that at least half of the radicals represented by R are

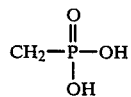

and n is an integer from 0 to 14. A specific example of (b) is amino triethylene phosphonate.

Still other phosphonates which may be employed are the salts of polyalkylene polyamino polykis-methylene phosphonic acids, which are disclosed in U.S. Pat. No. 3,619,427.

Additional organic phosphonates are disclosed in U.S. Pat. Nos. 3,214,454 and 3,336,221.

The phosphonates are used in the form of a salt and must be soluble in the aqueous carrier liquid in which they are introduced to the formation. Usually the sodium, potassium or ammonium salts are employed. The aqueous carrier liquid is preferably water. However, brines may also be used. The phosphonate concentration in the carrier liquid is usually between about 2 and about 5 percent active phosphonate.

The phosphate esters which may be used include materials having the following formula:

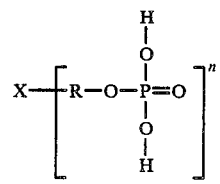

where R=alkyl group containing about 2 to about 10 carbon atoms, n=about 1 to 4, and X=a cation having valence of 3 or 4. The cation is usually nitrogen but may be phosphorous, bismuth, etc.

A specific example is hydroxylamine phosphate having the following formula:

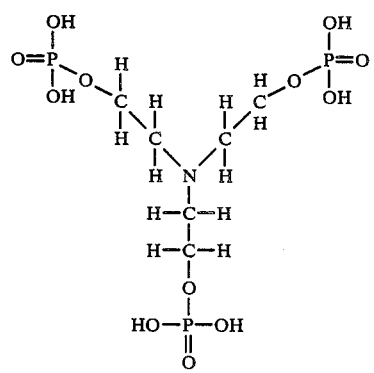

Phosphonic acids having the following formula are also useful in carrying out the invention:

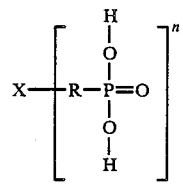

where R=alkyl group containing about 2 to about 10 carbon atoms, n=1 to 4, and X=carbon or cation having a valence of 3 or 4. The cation is usually nitrogen but may be phosphorous, bismuth, etc.

A specific example is amino tri(methylene phosphoric acid) which is represented by the following formula:

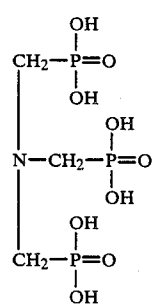

Also included are esters of phosphonic acids which have the following formula:

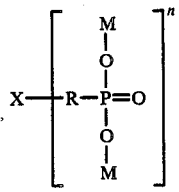

where R, X and n are the same as above, at least one M is an alkyl group containing about 2 to about 10 carbon atoms, and the other M may be hydrogen.

Other surface active agents which may be used are the inorganic polyphosphates having the following formula.

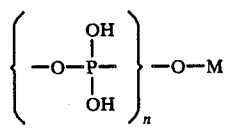

where M is sodium, potassium, ammonium or other cation.

Esters of inorganic polyphosphates having the following general formula may also be used:

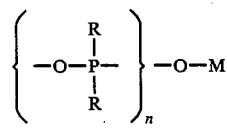

where one or more R's are alkyl groups containing about 2 to about 10 carbon atoms and the remaining R's are hydrogen.

The surface active agents which may be used in carrying out the process of the invention also include polymers such as polyacrylamides and polyacrylates. Following are specific examples of these materials:

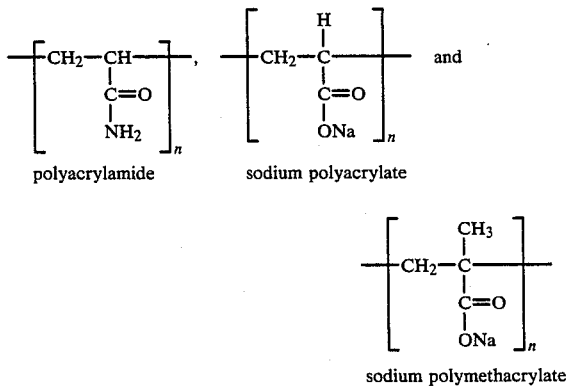

Surface active agents which are soluble in water are normally introduced to the hydrate problem area in an aqueous solution. Oil soluble surface active agents may be incorporated in a suitable solvent such as benzene, toluene, hexane, cyclohexane, alcohol or the like prior to use.

The concentration of phosphonate in the carrier fluid employed in carrying out the process of the invention has previously been described. Other surface active agents may vary in their concentration in the carrier fluid from between about 0.5 and about 500 milligrams per liter, usually between about 1 and about 5 milligrams per liter. The amount of surface active agent used will vary depending on the particular situation. For example, in a gas producing well the amount of surface active agent added may be from as low as a few milligrams per cubic meter of production gas to as high as 100 milligrams per cubic meter.

While the surface active agent is normally introduced to the hydrate problem area as a solution in a carrier fluid, it is within the scope of the invention to use this material in other forms. For example, the surface active agent can be provided in micro capsules. A procedure describing this alternative is set forth in detail in U.S. Pat. No. 4,456,067.

The problem of flow obstruction because of the formation of gas hydrates is not limited to producing gas wells. For example, hydrates are often formed during drilling operations when passing through zones containing natural gas. The problem is most serious in gas wells but may also occur in oil wells if water and gas are present in the fluid produced from the well. In the case of a drilling operation, the surface active agent is usually introduced to the well bore in the drilling fluid. The amount of surface active agent used will vary but may be as much as 500 milligrams per liter of drilling fluid. The problem of gas hydrates may also present itself in gas flow lines, primarily from offshore platforms to shore. The method of this invention may also be used to prevent stoppage in such flow lines. In this service the amount of surface active agent employed may be as high as 100 milligrams per cubic meter of flowing gas.

The following example illustrates the results obtained in carrying out the invention.

EXAMPLE

A gas well produces about 30,000 cubic meters per hour of natural gas. The water content of the gas and the bottom hole temperature are such that gas hydrate formation occurs and the gas flow is substantially reduced. A 15% aqueous solution of hydroxyl amine phosphate is introduced to the annulus of the well during gas production in an amount sufficient to provide 50 milligrams of phosphate/cubic meter of produced gas. The phosphate inhibits the formation of gas hydrates and/or the agglomeration of hydrate crystallites into large crystalline masses so that the flow of gas from the well is unimpeded and stabilizes at 30,000 cubic meters per hour.

We claim:

1. A method for preventing flow stoppage of a wet gas stream flowing under conditions of temperature and pressure conducive to the formation of gas hydrates, which comprises incorporating in the wet gas stream a surface-active agent selected from the group consisting of organic phosphonates, phosphate esters, phosphonic acids, salts and esters of phosphonic acids, inorganic polyphosphates, esters of inorganic polyphosphates, polyacrylamides and polyacrylates which inhibits the formation of gas hydrates and/or the agglomeration of hydrate crystallites into large crystalline masses, in a sufficient amount to prevent stoppage of the flowing stream.

2. In a process for drilling a well traversing one or more formations containing wet gas under conditions of temperature and pressure conducive to the formation of gas hydrates, the improvement which comprises introducing into the well a surface active agent selected from the group consisting of organic phosphonates, phosphate esters, phosphonic acids, salts and esters of phosphonic acids, inorganic polyphosphates, esters of inorganic polyphosphates, polyacrylamides and polyacrylates which inhibits the formation of gas hydrates and/or the agglomeration of hydrate crystallites into large crystaline masses, in a sufficient amount to prevent blockage of the well.

3. The process of claim 2 in which the surface active agent is introduced into the well in the drilling fluid.

4. In a process for producing from a well a wet gas stream under conditions of temperature and pressure conducive to the formation of gas hydrates, the improvement which comprises introducing to the well a surface active agent selected from the group consisting of organic phosphonates, phosphate esters, phosphonic acids, salts and esters of phosphoric acids, inorganic polyphosphates, esters of inorganic polyphosphates, polyacrylamides and polyacrylates which inhibits the formation of gas hydrates and/or the agglomeration of hydrate crystallites into large crystalline masses, in a sufficient amount to prevent flow stoppage of the wet gas stream.

5. In a process for flowing through a pipeline a wet gas stream from an offshore producing well to shore under conditions of temperature and pressure conducive to the formation of gas hydrates, the improvement which comprises introducing to the flowing stream a surface active agent selected from the group consisting of organic phosphonates, phosphate esters, phosphonic acids, esters of phosphonic acids, inorganic polyphosphates, salts and esters of inorganic polyphosphates, polyacrylamides and polyacrylates which inhibits the formation of gas hydrates and/or the agglomeration of hydrate crystallites into large crystalline masses, in a sufficient amount to prevent flow stoppage of the wet gas stream.

* * * * *